United States Patent
Schulze-Makuch et al.

(10) Patent No.: US 7,311,839 B2
(45) Date of Patent: Dec. 25, 2007

(54) REMOVAL OF BIOLOGICAL PATHOGENS USING SURFACTANT-MODIFIED ZEOLITE

(75) Inventors: Dirk Schulze-Makuch, El Paso, TX (US); Robert S. Bowman, Lemitar, NM (US); Suresh Pillai, College Station, TX (US)

(73) Assignees: New Mexico Tech Research Foundation, Socorro, NM (US); The Texas A&M University System, College Station, TX (US); Board of Regents, The University of Texas System, Austin, TX (US)

( * ) Notice: Subject to any disclaimer, the term of this patent is extended or adjusted under 35 U.S.C. 154(b) by 529 days.

(21) Appl. No.: 10/429,222

(22) Filed: May 2, 2003

(65) Prior Publication Data

US 2004/0108274 A1 Jun. 10, 2004

Related U.S. Application Data

(60) Provisional application No. 60/431,878, filed on Dec. 9, 2002.

(51) Int. Cl.
C02F 3/00 (2006.01)
(52) U.S. Cl. .................. 210/660; 210/679; 210/690; 210/691
(58) Field of Classification Search ............. 210/660, 210/679, 690–691
See application file for complete search history.

(56) References Cited

U.S. PATENT DOCUMENTS 4,344,848 A * 8/1982 Hakulinen .................. 210/617
4,818,414 A    4/1989 Ross .......................... 210/744
4,980,067 A * 12/1990 Hou et al. ................... 210/638
5,208,154 A *  5/1993 Weaver et al. .............. 435/176
5,320,773 A *  6/1994 Perman et al. .............. 252/191
5,337,516 A    8/1994 Hondulas ...................... 47/65
5,468,382 A * 11/1995 Cook et al. ................. 210/232
5,667,684 A *  9/1997 Motomura et al. ......... 210/506
5,958,228 A *  9/1999 Tokushima et al. ........ 210/199
6,001,838 A * 12/1999 Stockhammer et al. .... 514/256
6,034,010 A    3/2000 Cartwright et al. ......... 442/417
6,080,319 A *  6/2000 Alther ......................... 210/679

(Continued)

FOREIGN PATENT DOCUMENTS

EP         0334527        9/1989

OTHER PUBLICATIONS

"A pilot scale demonstration of an SMZ permeable barrier," Phase II of the surfactant modified Zeolite project, Oregon Graduate Institute of Science and Technology, 3 pages printed from http://cgr.ese.ogi.edu/smz/p2smz.htm, on Aug. 28, 2002.
"Catalysis and catalyst materials R&D in Japan," *Asian Technology Information Program (ATIP)*, Report # ATIP96.095, found at http://www.cs.arizona.edu/japan/www/atip/public/atip.reports.96/atip96.095r.html., Oct. 16, 1996.

(Continued)

*Primary Examiner*—Chester T. Barry
(74) *Attorney, Agent, or Firm*—Fulbright & Jaworski L.L.P.

(57) ABSTRACT

Systems and methods are described for removing biological pathogens using surfactant-modified zeolite (SMZ). A method for removing biological pathogens from a fluid or a fluid-based gel includes filtering the fluid or fluid-based gel using SMZs. A method for removing air-borne biological pathogens includes drawing air through a fluid layer or a fluid-based gel layer and filtering the fluid or the fluid-based gel layer using SMZs.

20 Claims, 8 Drawing Sheets

U.S. PATENT DOCUMENTS

| | | | | |
|---|---|---|---|---|
| 6,110,479 | A | 8/2000 | Blaney et al. | 424/402 |
| 6,186,938 | B1 | 2/2001 | Harwell et al. | 588/250 |
| 6,187,192 | B1* | 2/2001 | Johnston et al. | 210/502.1 |
| 6,193,886 | B1* | 2/2001 | Nohren, Jr. | 210/282 |
| 6,261,986 | B1 | 7/2001 | Bowman et al. | 502/62 |
| 6,663,783 | B2* | 12/2003 | Stephenson et al. | 210/748 |
| 6,838,005 | B2* | 1/2005 | Tepper et al. | 210/660 |
| 2005/0145552 | A1* | 7/2005 | Sheets | 210/192 |

OTHER PUBLICATIONS

"Protecting drinking water from disease transmission by means of Zeolite filters," *American Geophysical Union (AGU)*, Release No. 02-15, Apr. 25, 2002. Found at http://www.agu.org/sci_soc/prrl/prr10215.html.

Bales et al., "Bacteriophage adsorption during transport through porous media: chemical perturbations and reversibility," *Environ. Sci. Technol.*, 25:2088-2095, 1991.

Bowman et al., "A pilot test of a surfactant-modified zeolite (SMZ) permeable barrier for chromate and PCE removal," *Proceedings from the Conference on Industry Partnerships to Deploy Environmental Technology*, Poster Session I, P1.7, FETC Publications, 1997, abstract.

Bowman et al., "Pilot test of a surfactant modified zeolite permeable barrier for ground water remediation," *In: Physiochemical Groundwater Remediation*, Smith and Burns (eds.), Chapter 8, pp. 161-185, Kluwer Academic Publishers, 2001.

Bowman et al., "Uptake of cations, anions, and nonpolar organic molecules by surfactant-modified clinoptilolite-rich tuff," *In: Natural Zeolites For The Third Millenium*, Colella and Mumpton (eds.), pp. 287-297, De Frede Editore, Naples, Italy, 2000.

Bowman, "Pilot-scale testing of a surfactant-modified Zeolite PRB," *Ground Water Currents*, Issue #31, found at http://www.clu-in.org/products/newsltrs/gwc/view.cfm?issue=gwc0399.htm, Mar. 1999.

Cadena and Bowman, "Treatment of waters contaminated with BTX and heavy metals using tailored zeolites," *Proc. of the 4th Annual WERC Technology Development Conference*, 297-310, 1994.

Dentel et al., "Sorption and cosorption of 1,2,4-trichlorobenzene and tannic acid by organo-clays," *Water Research*, 32(12):3689-3697, 1998.

Dowd "Survival, adsorption, and subsurface transport of indicator viruses in aquifers using laboratory and field experiments," unpublished *Master Thesis, Texas A&M University*, 1996.

Dowd and Pillai, "Survival and transport of selected bacterial pathogens and indicator viruses under sandy aquifer conditions," *J. Environ. Sci. Health*, Part A, 32:2245-2258, 1997.

Dowd et al., "Delineating the specific influence of viral isoelectric point and size on viral adsorption and transport through sandy soils," *Appl. Environ. Microbiol.*, 64:405-410, 1998.

Fuierer et al., "Sorption and microbial degradation of toluene on a surfactant-modified-zeolite support," *Proc. Sixth International Symp. on In Situ and On-Site Bioremediation*, vol. 8, Jun. 4-7, San Diego, CA, 2001.

Gammack et al., "Factors affecting the movement of microogranisms in soils," *In: Soil Biochemistry*, Stotzky and Bollag (eds)., vol. 7:263-305, Marcel Dekker, New York, 1992.

Gerba et al., "Quantification of factors controlling viral and bacterial transport in the subsurface," In: *Modeling the Environmental Fate of Microorganisms*, Hurst (ed.), pp. 77-88, Am. Soc. for Microbiology, Washington, D. C., 1991.

Gerba et al., "Quantitative assessment of the adsorptive behavior of viruses to soil," *Environ. Sci. Technol.*, 15:940-944, 1981.

Harvey, "Parameters involved in modeling movement of bacteria in ground water," In: *Modeling the Environmental Fate of Microorganisms*, Hurst (ed.), Chapter 5: 89-114, Am. Soc. for Microbiology, Washington, D. C, 1991.

Hurst et al., "Effects of environmental variables and soil characteristics on virus survival in soil," *Appl. Environ. Microbiol.*, 40:1067-1079, 1980.

Jin et al., "Virus removal and transport in saturated and unsaturated sand columns," *Journal of Contaminant Hydrology* 43:111-128, 2000.

Keswick et al., "Survival of enteric viruses and indicator bacteria in ground water," *J. Environ. Sci. Health*, A17:903-912, 1982.

Li and Bowman "Sorption of perchloroethylene by surfactant-modified zeolite as controlled by surfactant loading," *Environ. Sci. Technol.*, 32:2278-2282, 1998.

Li and Bowman, "Retention of inorganic oxyanions by organo-kaolinite," *Water Res.*, 35:3771-3776, 2001.

Li and Bowman, "Sorption of chromate and PCE by surfactant-modified clay minerals," *Environ. Eng. Sci.*, 3:237-245, 1998.

Li et al., "Desorption of hexadecyltrimethylammonium from charged mineral surfaces," *Environ. Geosci.*, (submitted), 2003.

Li et al., "Long-term chemical and biological stability of surfactant-modified zeolite," *Environ. Sci. Techn.*, 32:2628-2632, 1998.

Li et al., "Sorption of ionizable organic solutes by surfactant-modified zeolite," *Environ. Sci. Techn.* 34, 3756-3760, 2000.

Lifewater Canada website, found at www.lifewater.ca, copyright © 2000.

Loveland et al., "The reversibility of virus attachment to mineral surfaces," *Colloids and Surfaces A: Physicochemical and Engineering Aspects*, 107:205-221, 1996.

Maschinski et al., "Efficiency of a subsurface constructed wetland system using native southwestern U.S. plants," *J. Env. Qual.*, 28:225-231, 1999.

Pillai and Vega, "Pathogen removal with on-site wastewater treatment technologies," *Proceedings of the "Alliance for environmental stewardship: a comprehensive approach"*. St. Louis, Missouri, 1999.

Pillai, "Future advance in subsurface microbiology," In: *Microbial Pathogens Microbial Pathogens in Aquifers: Principals and Protocols*, Pillai (ed.), Chapter 9: 133-139, Springer Verlag, Berlin, 1998.

Rose and Yates, "Microbial risk assessment applications for ground water," In: *Microbial Pathogens Within Aquifers: Principles and Protocols*, Pillai (ed.), Chapter 8: 113-131, Springer Verlag, Berlin, 1998.

Schaub and Sorber. "Virus and bacteria removal from wastewater by rapid infiltration through soil," *Appl. Environ. Microbiol.*, 33:609-619, 1977.

Schijven et al., "Modeling virus adsorption in batch and column experiments," *Quant. Microbiol*, 2:5-20, 2001.

Schulze-Makuch et al., "Effects of pH and geological medium on bacteriophage MS-2 transport in a model aquifer," *Geomicrobiology Journal*, 20:73-84, 2003.

Schulze-Makuch et al., "Surfactant-modified zeolite can protect drinking water wells from viruses and bacteria," *EOS, Transactions American Geophysical Union*, 83(18):193, 200-201, 2002.

Sobsey et al., "Comparative reductions of Hepatitis A virus, enteroviruses and coliphage MS-2 in miniature soil columns," *Water Science and Technology*, 31(5-6):203-209, 1995.

Solley et al., "Estimated use of water in the United States in 1985," U.S. Geological Survey Circular # 1004, 1988.

USEPA (United States Environmental Protection Agency). "Method 1601: Male-specific (F+) and somatic coliphages in water by two-step enrichment procedure," Office of Water, Washington, DC, EPA 821-R-01-030, 2001.

Woessner et al., "Viral transport in a sand and gravel aquifer under filed pumping conditions," *Ground Water*, 39(6):886-894, 2001.

Yates and Jury, "On the use of virus transport modeling for determining regulatory compliance," *Journal of Environmental Quality*, 24:1051-1055, 1995.

Yates et al., "Virus persistence in groundwater," *Appl. Environ. Microbiol.*, 49:778-781, 1985.

Bowman et al., "Sorption of nonpolar organic compounds, inorganic cations, and inorganic oxyanions by surfactant-modified zeolites," *ACS Symposium Series*, 1995, Ch. 5, pp. 1-7.

Dean, *Lange's Handbook of Chemistry*, McGraw-Hill, Inc., Table 8.2, 1999.

He et al., "Surface charge properties of and Cu(II) adsorption by spores of the marine bacillus sp. strain SG-1," *American Chemical Society National Meeting*, 213:176, 1997.

Van der Wal et al., "determination of the total charge in the cell walls of Gram-positive bacteria," *Colloids and Surfaces B: B&O Interfaces*, 9: 81-100, 1997.

* cited by examiner

REMOVAL OF BIOLOGICAL PATHOGENS USING SURFACTANT-MODIFIED ZEOLITE

CROSS-REFERENCE TO RELATED APPLICATION

This application is related to, and claims a benefit of priority under 35 U.S.C. 119(e) and/or 35 U.S.C. 120 from, copending provisional U.S. Ser. No. 60/431,878, filed Dec. 9, 2002, the entire contents of which are hereby expressly incorporated by reference for all purposes.

The government may own rights in the present invention pursuant to grant number CX827-370-01-0 from the EPA to UTEP.

BACKGROUND OF THE INVENTION

I. Field of the Invention

The present invention relates generally to the field of water treatment. More particularly, it provides a variety of compositions and methods for use in the removal of biological pathogens from water using Surfactant-Modified Zeolite (SMZ).

II. Description of Related Art

It is known that septic tanks, sewage effluents, and landfills can release microbial and viral pathogens into groundwater. Microbial contamination of drinking water is a serious problem with global significance (Pillai, 1998). In many countries around the world, including the United States, groundwater serves as a primary drinking water source. In the United States, groundwater provides approximately 40% of the water supply used for public consumption (Solley et al., 1985). In other countries such as Denmark, approximately 98% of the drinking water supply is obtained from groundwater (Czako, 1994). Groundwater is susceptible to fecal contamination from a variety of sources including leaking sewer lines, leaking septic tanks, infiltration of surface water contaminated by human and animal wastes, and careless disposal of septic wastes. It is estimated that between 1971 and 1994, there were as many as 342 disease outbreaks in the United States that were associated with contaminated groundwater (Rose and Yates, 1998). Microbial pathogens were shown to be responsible for almost 30% of these outbreaks (Cothern, 1992; Craun and Calderon, 1996).

Due to technological and other limitations, the causative agents for a majority of these disease outbreaks are still unknown, although clinical features suggest a viral etiology for most of these cases (CDC, 1993). Enteric pathogens can survive for extended periods of time in groundwater and can also migrate significant distances in groundwater (Keswick et al., 1982; Schaub and Sorber, 1979; Idelovitch et al., 1980; Rehmann et al., 1999; Woessner et al., 2001 Dowd et al., 1998). Adding to this concern, enteric viruses and certain bacterial pathogens such as Shigella spp. have relatively low infectious doses. Rose et al. (1997) have reported that the probability of infection resulting from one Hepatitis A or Rotavirus particle or Shigella cell are 42%, 27%, and 0.06% respectively. Inexpensive solutions for removing biological pathogens from water are urgently needed. The recent threat of bioterrorism and concerns for the safety of drinking water supplies further add to this urgency.

SUMMARY OF THE INVENTION

According to an aspect of the invention, there is provided a method for removing biological pathogens from a fluid or a fluid-based gel by passing the fluid through a filter utilizing a surfactant-modified zeolite (SMZ). A water filter, water treatment facility, and an air filter may utilize this method. According to another aspect of the invention, there is provided a method for removing air-borne pathogens that comprises drawing air through a fluid layer or a fluid-based gel layer. The fluid or fluid-based gel is then filtered using SMZ. The method can be implemented by an air filter.

The biological pathogens include bacteria, viruses, protozoa, parasites, and microbes. The fluid may be forms of water, such as drinking water, ground water, well water, or waste water. The SMZ can be in granular form, combined with a binder material, and/or can be formed into a solid structure. The solid structure can be in the form of any shape suitable for inclusion into a filtration device. The filtration device can be a potable water filter, a point of use water filter, a water bottle filter, or a filter packet that is to be placed into a body of water such as a well or small pond.

According to another aspect of the invention, there is provided a water well comprising a well casing, a well screen, a filter pack made from surfactant-modified zeolite (SMZ) surrounding the well screen or in an alternative configuration such that water must pass though the filter pack before extraction from the casing, and a pump. The SMZ is in granular form and the SMZ particles are larger than openings in the well screen, or contained in a package (e.g., a mesh bag) having openings smaller than the SMZ particles. The well screen may be a screened section of pipe, holes drilled in the well casing, or other manner of allowing water to enter the casing.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
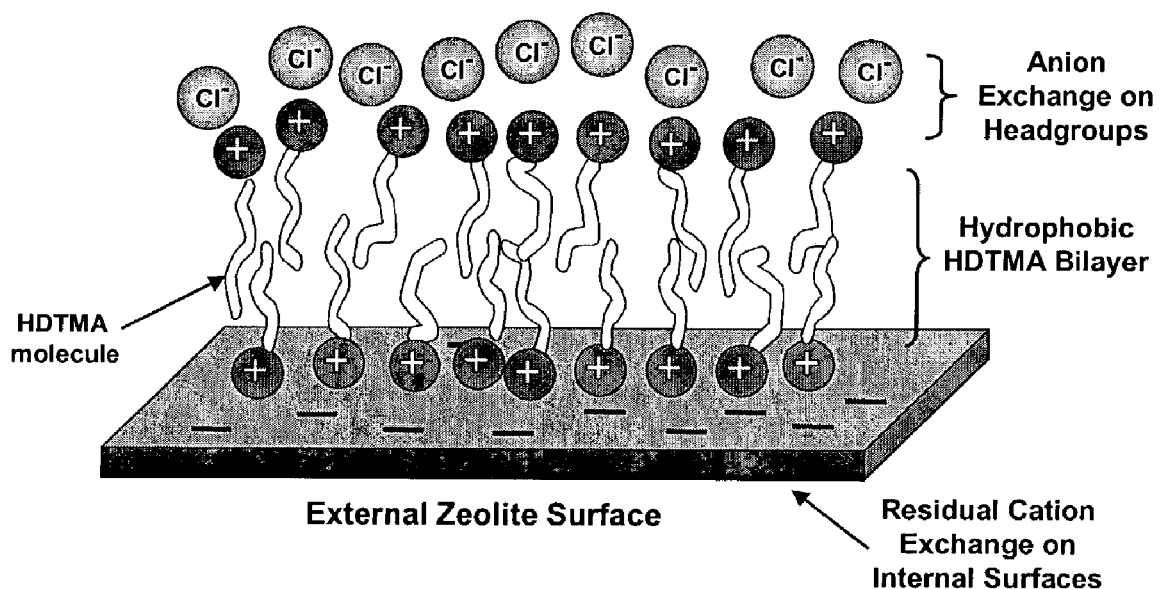
FIG. 1 is a schematic which shows anion exchange and organic partitioning on surfactant-modified zeolite (SMZ).

I. Contamination of Water and Other Fluids

Contamination of fluids occurs whenever foreign substances are introduced into the fluid. In the case of water, this can happen in various ways. Through industrial processes, various byproducts of production facilities can seep into water sources. Biological contamination occurs with improper sanitary habits, especially prevalent in Third World countries, where a river or lake may provide water for consumption as well as serving as a bathing facility and bathroom. These practices can introduce various parasites, bacteria, and viruses into the drinking water supply.

The major factors controlling pathogen fate and transport in ground water are attachment and detachment, inactivation, advection, and dispersion (Gerba et al., 1991; Bales et al., 1991; Harvey, 1991). Enteric mammalian viruses do not multiply in groundwater. However, virus survival or persistence within aquifers has been shown to be highly site specific and virus specific (Dowd and Pillai, 1997; Gerba et al., 1981; Hurst et al., 1980; Yates et al., 1985). Under certain environmental conditions, some enteric bacteria such as *E. coli* can persist and even multiply in the environment (Solo-Gabriele et al., 2000; Gagliardi and Karns, 2000). Advection and dispersion which depend on the hydraulic properties of the aquifer are complex processes in which several interactions between the pathogens and porous medium particles are involved. Forces responsible for the attachment and detachment of pathogens include electrostatic attraction and repulsion, van der Waals forces, and hydrophobic effects (Jin et al., 2002; Schulze-Makuch et al., 2002b; Dowd et al, 1998; Schijven et al., 2000). Brownian movement and straining, which depend on the size of the pathogen and the medium particles, can also contribute to the attachment of viruses and bacteria onto porous media.

II. BIOLOGICAL PATHOGENS

Biological pathogens are entities such as viruses, bacteria, protozoa, parasites, and various other microbes. Viruses possess a protein coat that results in a surface charge that varies with pH. The isoelectric point ($pH_{iep}$) of a virus particle is used to describe its net charge in the groundwater environment. The $pH_{iep}$ is a specific pH value at which the virion has a net neutral charge. If the pH of water is greater than the $pH_{iep}$ of a certain virion (or particle) in water, the surface of the virus particle is negatively charged. The surface is positively charged if the pH of water is lower than the $pH_{iep}$ of the virion. At typical ground water pHs, most virions have a net negative surface charge. Due to their net positive charges, materials with high isoelectric points may be suited as geological barriers to virus migration.

Pathogenic bacteria and viruses tend to be negatively charged in the pH range of most groundwaters. This is a characteristic that aids in the filtration of fluids containing biological pathogens. Naturally-occurring and modified materials having net positive surface charges may be suited as barriers to pathogen migration and as filtration materials. Iron-oxide-coated sand (ICS) may serve as a suitable barrier material due to its high $pH_{iep}$ (8.5). Some clay minerals have large specific surface areas and can be modified with cationic surfactants to exhibit a positive surface charge (Dentel et al., 1998; Li and Bowman 1998a, 2001); however, the low hydraulic conductivities of most clays limit their suitability as filters or other permeable barrier configurations for practical applications. Zeolites share many of the surface properties of clay minerals (high specific surface areas and cation exchange capacities), but can be prepared in a wide range of grain sizes. Some workers have used surfactant-modified zeolites (also known as tailored zeolites) to remove heavy metals and organic contaminants from water (Cadena and Bowman, 1994; Bowman et al., 2000). Cationic surfactants are used to reverse the surface charge of zeolite from negative to positive. Thus, this treatment may optimize the zeolite's ability to adsorb negatively charged pathogens in groundwater.

III. SURFACTANT-MODIFIED ZEOLITES

The present invention overcomes deficiencies in the art by providing a variety of compositions and methods for use in the removal of biological pathogens from a fluid or a fluid-based gel using Surfactant-Modified Zeolites (SMZ). SMZs are created by treating zeolites with a surfactant, such as hexadecyltrimethylammonium (HDTMA), which converts the negative surface charge of the zeolites to the positively charged surface of the SMZ. This development of an inexpensive means for blocking the transmission of bacteria, viruses, parasites, and other microbes to humans can significantly reduce disease outbreaks associated with contaminated groundwater and also alleviate concerns regarding bioterrorist threats to drinking water supplies.

SMZs for filtering are made by a method of intimate mixing and binding of materials to create a pollutant adsorption/degradation filter material. This method mixes at least one adsorbent material (for example, natural zeolite) with at least one surface-altering material (for example, a surfactant). The resultant SMZ can be used directly for pathogen control. Depending upon the application the SMZ is to be used for, a binder (for example, an aluminosilicate binder) may also be added to the mixture. This mixture is processed to form porous, highly permeable pellets, blocks, or other shaped forms to produce a durable filter product which is stable in fluids. The adsorbent material is modified with surfactant prior to or after the processing. Other components may be added or the processing modified to vary the density, porosity, or permeability of the filter product or to improve the adsorption and pathogen destruction properties of the product.

Surfactant-modified zeolite (SMZ), in contrast to surfactant-modified clay minerals, has excellent hydraulic properties. In addition to effectively adsorbing nonpolar organic contaminants, SMZ has great affinity for inorganic oxyanions such as chromate, arsenate, sulfate, selenate (Bowman et al., 1995) and heavy metal cations such as lead (Bowman et al., 1997). Thus, SMZ can be used to remove multiple contaminants simultaneously and its economical cost makes it attractive for adsorption filters. Many different surfactants may be used, including hexadecyltrimethylammonium, octadecyltrlmethylammonium, and 4-methylpyridinium.

The advantage of using SMZ as a filter is its low cost as well as the instantaneous adsorption of multiple types of contaminants.

A number of advantages are realized in the preparation of the surfactant-modified zeolite using the present technique, including the selection of raw materials in terms of size, shape and composition, as well as in the ease of manufacturing. It is well known that available surface area is the key to the reactivity of adsorptive materials. Following this logic, the selection of finely ground raw materials is superior to larger sizes. However, finer or smaller aggregates result in reduced hydraulic conductivity or permeability of the product. To overcome this limitation, the finely ground material can be agglomerated or pelletized. In this fashion, not only can the permeability of the product be greatly improved, but so can the strength of the individual pellets. Strength is important for increased resistance to mechanical abrasion or dissolution of the material in service.

While the pelletization of zeolite materials can be accomplished by a number of conventional techniques, a major concern is the reduction in the overall reactivity or adsorptive ability of the agglomerated pellets due to the particular techniques and/or binder system used to form the pellets. In order to fully utilize the benefits afforded by the combination of ingredients in the proposed invention (surfactant and zeolite) the diffusion ability of the contaminants in question should not be limited or unduly interfered with. Consequently, an ideal binder system, if needed, would be one in which a pellet with maximum adsorption capacity is achieved with maximum macroporosity for minimum diffusion resistance to the critical ingredients while at the same time providing sufficient strength to withstand the normal handling, abrasion, and dissolution associated with its use in service. If the binder used in the pelletizing process seals the surface of the pellet thereby preventing access to the surrounding contaminated environment, the effectiveness of the adsorption properties is also severely limited. In addition, if the binder used acts as an inert filler to bond the reactive/adsorption materials together, then the overall useable content is also reduced. For example, if 20% by volume of an inert binder phase is required to bond the reactive/adsorption material, then the overall availability of the reactive/adsorptive material is reduced by this same 20%. In the present technique, all of these shortcomings are overcome by using an inorganic binder system that is itself an adsorptive material capable of adding to the overall effectiveness of the pelletized agglomerate.

In addition to using natural zeolite as the adsorbent, synthetic zeolite could be used. The surfactant is a cationic surfactant, and can be, for example, hexadecyltrimethylammonium, octadecyltrimethylammonium, methyl-4-phenylpyridium, phenyltrimethylammonium, benzyltrimethylammonium, and other cationic surfactants having a molecular weight greater than 125. Activated carbon or charcoal could also be added to the mixture prior to the step of binding the constituents.

One of the preferred methods used in the present invention utilizes a sodium aluminosilicate hydrogel binder system to achieve a highly porous binder phase capable of contributing to the adsorptive capacity of the final pellet. The amorphous sodium aluminosilicate hydrogel has ion exchange characteristics similar to the zeolite portion of the pellets. This hydrogel is formed by the controlled blending of soluble silicate and aluminate materials that when mixed in the proper portions will gel in a controlled, reproducible amount of time, binding any ingredients added to these solutions prior to mixing. A foaming agent, such as aluminum metal powder, could also be added to the binder portion to increase permeability and hydraulic conductivity of the filter article. In particular, if a sodium aluminosilicate hydrogel binder system is utilized, the aluminum metal powder can be added prior to gelation, resulting in the evolution of hydrogen gas that causes the pellets to foam prior to setting of the material.

IV. Filtering Fluids Using SMZ

Passing typical ground water that contains biological pathogens, which may carry a negative surface charge, through inexpensive SMZ filters can result in the adhesion of the pathogens to the positively-charged SMZ filter and the removal of the pathogens from the drinking water. SMZs have the desirable characteristics of possessing a large surface area and remaining rigid in water, which provides an advantage over the use of clay minerals which swell in water and can limit the efficient flow of water.

In one embodiment of the invention, SMZ can be prepared from zeolite alone, or be combined with a binder, such as a polymeric or oligomeric material, to form a solid structure that can be molded or pressed into any desirable shape, e.g., a shape suitable for inclusion into the housing of a filtration device. In another embodiment of the invention a filtration device is provided for fluid inflow and outflow, and contains one or more chambers for contact of the fluid with the purification material. The filtration device may be a household water filter, a filter fitted on to the end of a faucet, or a water bottle filter for use during a trip. The filtration device may also be one that is placed in or around a well or other body of water for the purpose of removing biological pathogens from a water source.

For example, SMZ can be used to prepare a filter pack for wells. Filter packs are made of granular materials whose particle size is typically in the range of sand particles to gravel particles. The filter packs are placed around the well screen during the construction of the well. Methods of installation of filter packs are known in the art and not detailed here. The filter pack filters the ground water as it enters the well, removing items such as dirt, bacteria, and microbes.

SMZ filters can be used in industrial applications such as filtering fluids used in cooling systems. Fluids used as a coolants in industrial systems often pass through towers, ponds, or other process equipment where microorganisms can come into contact with the fluid, obtain nutrients, and propagate. The microbial growth in the fluid can progress to a state whereby process equipment becomes clogged or damaged and requires extensive chemical treatment to destroy the microbes. The use of SMZ filters to remove the microbes before they can propagate substantially will reduce the cost and possible dangers associated with chemical treatment programs.

SMZ filters, in conjunction with a fluid layer, can also be used to filter bacteria, viruses and other biological pathogens out of the air. The air containing the bacteria and viruses would be pulled into the fluid layer, due to a lower pressure difference on the fluid layer side of the filter, is passed on to the SMZ filter material for sorption, and the purified fluid is conducted away from the higher pressure side of the filter. An industrial example using the air purifying embodiment previously disclosed would be the purification of recycled air in transport systems (such as commercial airliners, or buses, or trains, or ships, or trailers, or food trailers, automobiles, or vans, or trucks, or SUVs, or cars). In addition, the material of the current invention can be used to increase indoor air quality in homes or offices in conjunction with the air circulation and conditioning systems already in use therein. The purification system disclosed for air could also be used to purify other gases, such as anesthetic gases used in surgery or dentistry (e.g., nitrous oxide), gases used in the carbonated beverage industry (e.g., carbon dioxide), gases used to purge process equipment or to remove particles from surfaces (e.g., nitrogen, carbon dioxide, argon), etc.

As used herein the specification, "a" or "an" may mean one or more. As used herein in the claims, when used in conjunction with the word "comprising", the words "a" or "an" may mean one or more than one. As used herein "another" may mean at least a second or more.

As used herein the specification, "zeolites" refers to naturally-occurring or synthetic aluminosilicates with open, cage-like structures and high internal and external cation exchange capacities. As used herein the specification, "fluid" and "fluids" refer to both liquids and gases.

V. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Methodology and Approach

Iron-oxide coated sand (ICS), untreated zeolite (UZ), and surfactant-modified zeolite (SMZ) were tested for their suitability as permeable barriers to inhibit virus migration. Sand grains coated with ferric oxyhydroxides were prepared by adding anhydrous $FeCl_3$ solution to the sand and precipitating iron oxyhydroxides at high pH with the addition of NaOH. After several days of coating followed by rinsing through a 500-μm sieve to remove colloidal and fine particulates of iron oxide, the sand was dried at 95° C. overnight. The iron coating increased the $pH_{iep}$ of the sand (consisting of a mix of quartz and feldspar minerals) from an average of 4 to about 8.5, reflecting the change to a positive surface charge.

In this study, a clinoptilolite-dominated zeolite (St. Cloud Mining Co., Truth or Consequences, New Mexico) was selected from the more than 40 naturally-occurring zeolite minerals. About 70% clinoptilolite by weight, the zeolite had a specific surface area of 15 $m^2/g$, a particle size of 1.4-2.4 mm, and a bulk density of 0.9 $g/cm^3$. The zeolite surface area is about two orders magnitude larger than that of the sand used here.

Due to isomorphic substitution by aluminum in the silicate crystal lattice, zeolites possess a net negative surface charge, which limits their capacity for adsorbing viruses. However, the surface charge can be reversed by treatment with long-chain cationic surfactants. For this study, the untreated zeolite (UZ) was modified by spraying a 30% aqueous solution (by weight) of hexadecyltrimethylammonium chloride (HDTMA-Cl) onto the zeolite, thoroughly mixing the slurry for 5 min, and drying the resultant surfactant-modified zeolite (SMZ) at 250° C. for 10 min, to yield SMZ with an HDTMA content of 140 mmol/kg. HDTMA is a bulk-production surfactant used in hair conditioners and mouthwash. HDTMA quantitatively exchanges with charge-balancing inorganic cations on the external zeolite surface and forms a stable surfactant bilayer. Bilayer formation reverses the zeolite surface charge from negative to positive and creates a hydrophobic environment at the zeolite surface (Bowman et al., 2000). The anion exchange and the organic partitioning properties of SMZ promote bacteria and virus adsorption. The surface of SMZ is shown schematically in FIG. 1.

The permeable barrier materials were tested both in the laboratory and in the field. The SMZ was found to be stable in water with ionic strength greater than 5 mM. Thus, the ionic strength of the water was controlled to be between 5 mM and 15 mM for both the lab and field experiments. Bacteriophages were used instead of enteric viruses due to the biological hazards of the latter. Bacteriophages serve as good surrogates for investigating behavior of human enteric viruses in the environment because of their similarities in dimensions, reported similarities in behavior to enteric viruses, and relatively low assay costs (Sobsey et al., 1995; Dowd et al., 1998; Nasser and Oman, 1999). Particularly suited are MS2 and phix174. MS2 has a $pH_{iep}$ of 3.9 and a diameter of 24 nm, while phix174 has a $pH_{iep}$ of 6.6 and a diameter of 27 nm. The host bacteria for MS2 was *E. coli* F. amp, while for phix174, it was *E. coli* ATCC 13706, respectively. The titer of the phages in the water samples was tested within three days using the double-agar-layer method (Adams, 1959). Bromide was used as a water tracer and its concentrations were measured using capillary electrophoresis.

Laboratory Experiments

A model Plexiglas aquifer (109 cm×40 cm×2 cm) was used for the laboratory experiments. The model aquifer was filled with sieved play sand (grain size: 90% 0.5-1.0 mm, 10%<0.5 mm). The mineralogical composition of the sand was 70% quartz sand, 10% feldspar, and 20% volcanic rock fragments with an elemental composition similar to feldspar. The porosity of the sediment was 0.48, and the hydraulic conductivity was $1.3 \times 10^{-3}$ m/s. Ten piezometers for injection and sampling were aligned with equal spacing along the main flow line through the model aquifer. The experimental runs were completed under room temperature (20-25° C.), which match ground-water temperatures in shallow aquifers near the Mexico-USA border. The hydraulic gradient was controlled by manipulating the water levels in the inlet and outlet reservoirs. Before each experimental run, the model aquifer was flushed with 5 pore volumes of de-ionized water and background samples for pH, bromide and phages were collected from the injection well and sampling ports. MS2 and phix174 ($10^6$ pfu/ml) and bromide (1000 mg/l, as NaBr) were injected together into the aquifer. Water samples were collected from the sampling ports based on predictions of a finite-difference computer model that was used to simulate bromide migration rates. The samples were stored under 4° C. until analysis. The model aquifer results included one control run (without a barrier), one run with UZ as a barrier, one with ICS as a barrier, and two runs with SMZ as permeable barriers.

Separate laboratory studies were conducted to distinguish adsorption versus inactivation of MS2 coliphage by SMZ. For the adsorption study, defined numbers of coliphages were added to aqueous suspensions of SMZ in separate tubes. The tubes were periodically removed and centrifuged to separate the adsorbed phages from those in suspension, and the numbers of suspended phages were enumerated. For the inactivation studies, SMZ was equilibrated with water (1:2 mass:volume) in the absence of coliphage. The equilibrated water was separated from the SMZ and inoculated with coliphage in separate tubes. Coliphage inactivation over time was determined for these SMZ-free samples. The sorption and inactivation studies both were conducted by mixing at room temperature for 120 min using a rotary laboratory shaker.

Field Experiments

Figure 3:
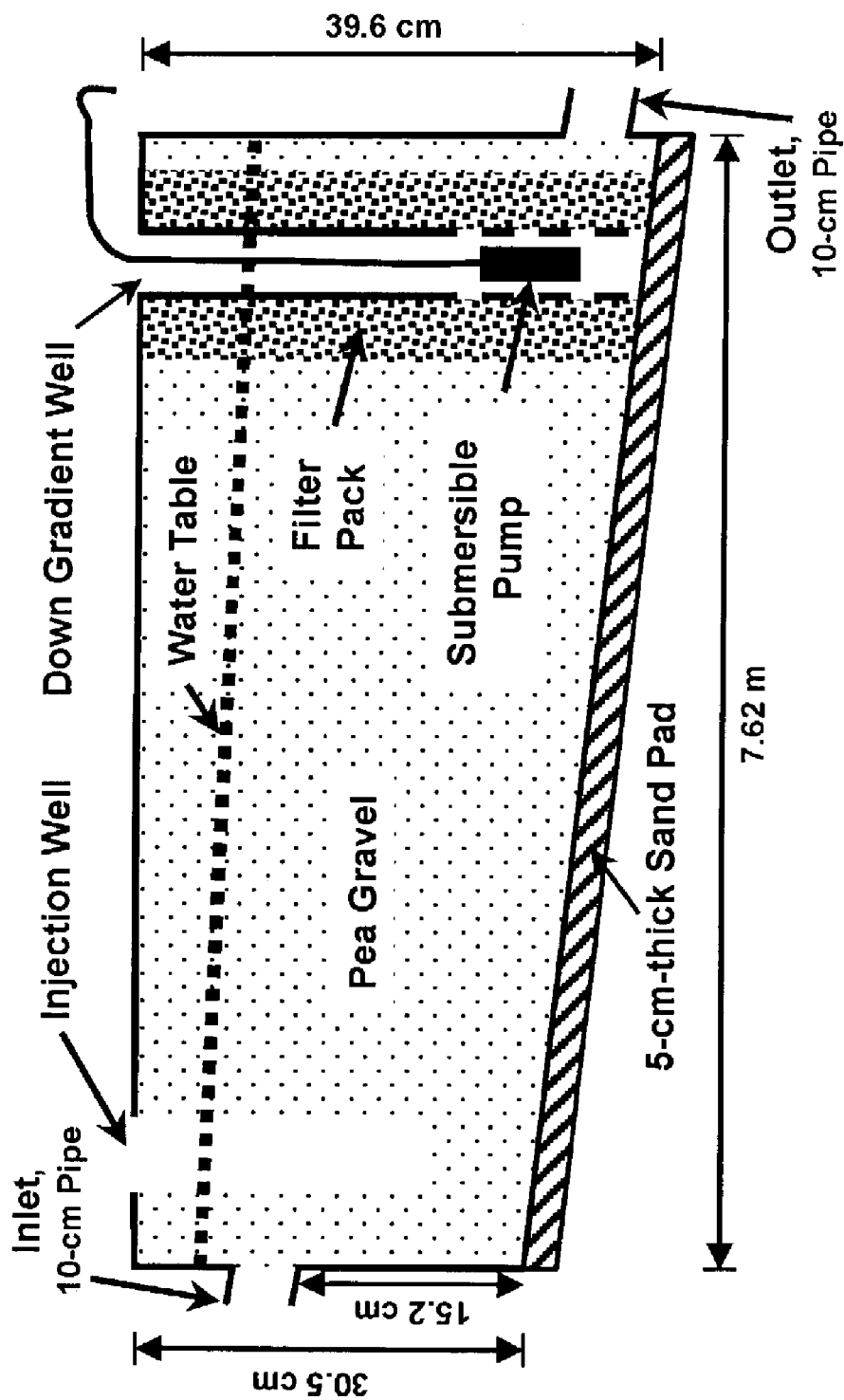
FIG. 3 is a profile of a constructed wetland with injection well and down gradient well.

The field experiments were conducted at a site where sewage effluent was discharged from a septic system into a constructed submerged wetland. The constructed wetland had dimensions of 7.62 m by 3.05 m and was filled with pea gravel with a grain size of 0.95 cm (FIG. 3). The gravel depth ranged from 30.5 cm to 39.6 cm from the influent to the effluent side (1% slope). Twenty-five milliliters of MS2 at a concentration of about $10^{10}$ pfu/ml and 2 ml of E. coli at a concentration of $10^7$ cfu/ml were diluted in 3.785 L of deionized water enriched with 300 mg/L NaCl solution to prevent osmotic shock. A 1 ml water sample from each container was collected to measure concentrations before injection. 40 g of NaBr were diluted in 3.785 L in a separate container of water and used as a conservative tracer. MS2, E. coli, and bromide were then injected together into the ground water at the influent side of the wetland. A well at the downgradient side of the wetland was used to monitor effluent concentrations. Effluent concentrations were also measured at the outflow of the constructed wetland.

The first field test was conducted without any barrier material. The effluent well was used solely as monitoring well (no pumping took place). In the tests using ICS and SMZ as barrier material, the effluent well was pumped at a rate of 12 ml/s to mimic a water supply well used for domestic use. With this rate of extraction, approximately ⅔ of the discharged water from the wetland went through the effluent well and ⅓ of the water through the constructed outflow. The permeable barrier materials were used as filter packs for the effluent well. The filter pack had a thickness of about 10 cm with an average residence time of the water in the filter pack of about 2 minutes. This design allowed evaluation of the efficiencies of ICS and SMZ in removing viral and bacterial concentrations from the septic ground water by comparing (1) ICS and SMZ results to the control run without any barrier, and (2) comparing the water analysis results from the effluent well to that of the outflow of the constructed wetland (no interaction with permeable barrier material).

Results

Figure 2:
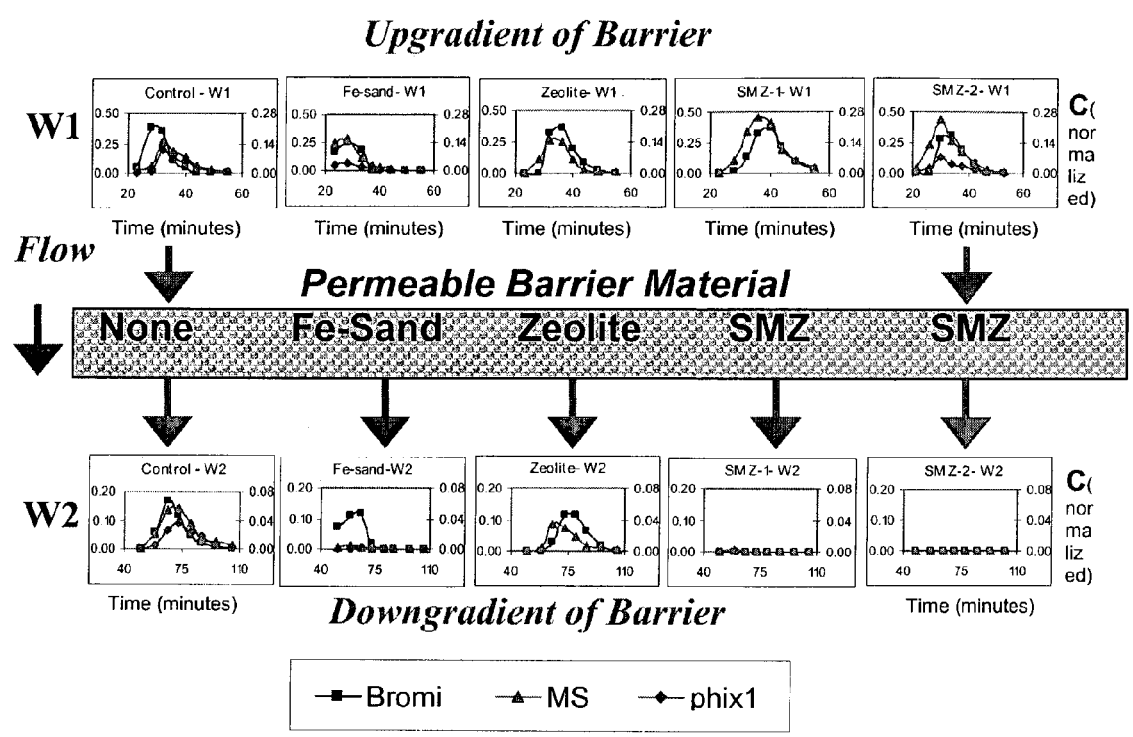
FIG. 2 shows the effect of various permeable barriers on virus and bromide concentrations in a model aquifer. W1 is the monitoring well upgradient of the barrier, and W2 the monitoring well downgradient of the barrier. Bromide concentrations are given on the primary y-axis; virus concentrations are given on the secondary y-axis.

The data from the model aquifer experiments are summarized in FIG. 2. Untreated zeolite failed to remove the more negatively charged MS2 to a significant extent. Fe-oxide coated sand did remove phix174 and MS2 to a large extent. SMZ completely removed both viruses as well as bromide.

Figure 4:
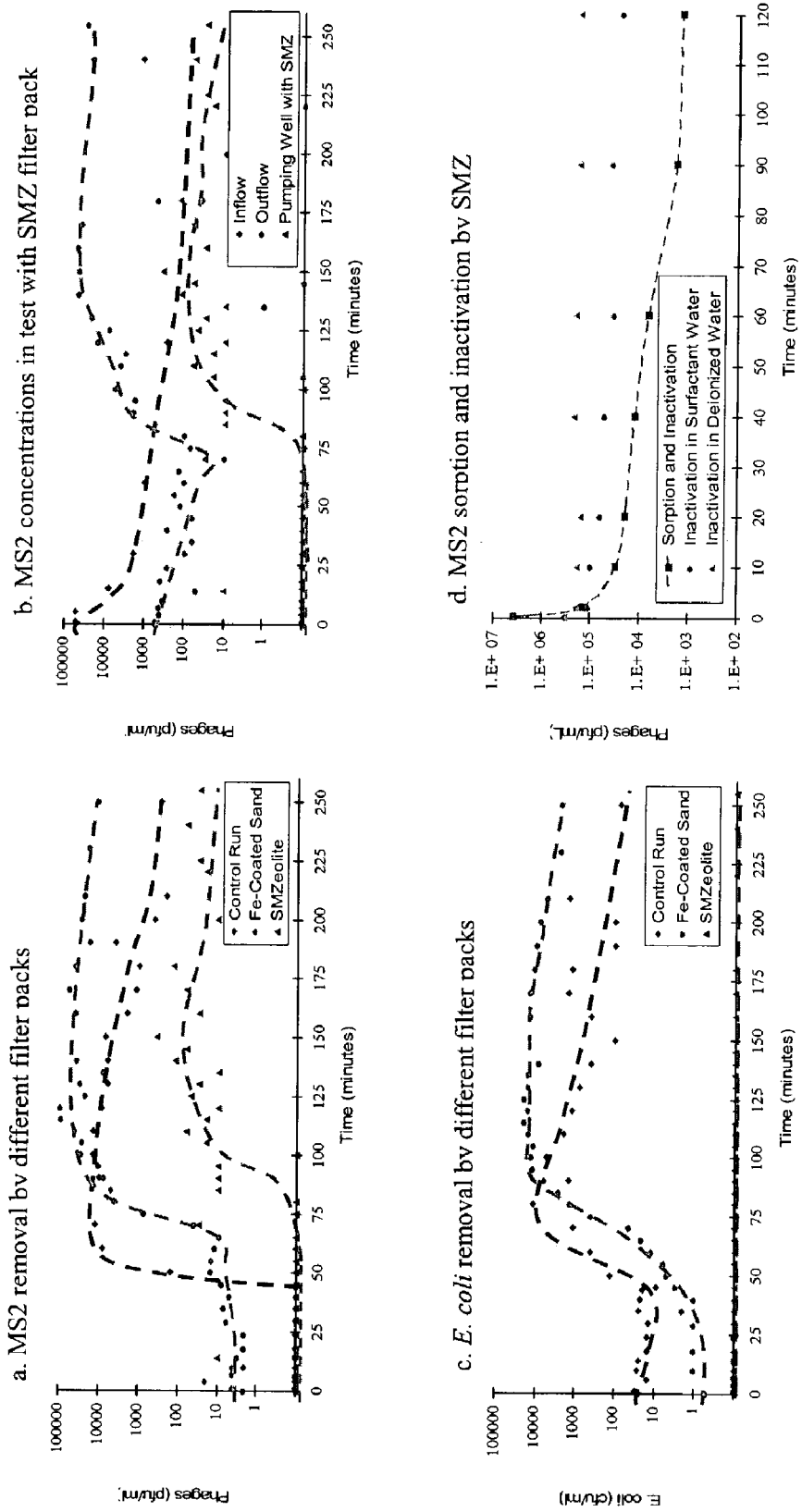
FIG. 4 shows the results of field deactivation tests. (pfu=plaque forming units; cfu=cell forming units; dashed lines=interpreted breakthroughs) The high virus removal efficiency of the SMZ filter pack can be shown by comparing it to the Fe-coated sand filter pack (FIG. 4A) and by comparing virus concentrations from the effluent well with water from the constructed outflow (FIG. 4B). The SMZ filter pack also removed 100% of *E. coli* in the water (FIG. 4C). Sorption and inactivation tests revealed that the virus removal can be attributed mostly to sorption, and to a lesser degree, to inactivation due to surfactant in water (FIG. 4D).

In the field tests, Fe-oxide coated sand did not perform well as a filter pack material. Compared to ICS, SMZ removed about 100 times more viruses (FIG. 4A). The high efficiency of SMZ can also be shown by comparing the water withdrawn from the effluent well with water from the outflow. SMZ removed at least 99% of the viruses in the water (FIG. 4B). In addition, the SMZ removed 100% of E. coli present in the water (FIG. 4C), while the ICS did not show any effect on E. coli concentrations.

The sorption and inactivation tests indicate that virus titers declined significantly because of the combined effects of sorption and inactivation by SMZ (FIG. 4D). While most of the viruses were removed by sorption, the inactivation of viruses (in the presence of SMZ-derived HDTMA) within 120 minutes is significant considering that under the field conditions, the viruses could have been exposed to dissolved surfactant for even longer periods of time. Natural inactivation, on the other hand, was shown to be insignificant for the time scale of these experiments (FIG. 4D).

Discussion

Based on both laboratory and field results, surfactant-modified zeolite (SMZ) performed very well in removing viruses from the ground water. The only concern is the non-selectivity of SMZ, e.g. the removal of both viruses and negatively charged ions such as bromide, which may limit the applicability of SMZ in high-salinity waters and in long-term applications. ICS removed viruses very efficiently in the lab experiments and on a selective basis, but failed to remove a significant amount of viruses in the field tests. Untreated zeolite is not a suitable material for removing viruses because of its net negative surface charge. ICS performed surprisingly poorly in the field tests. Virus and E. coli concentrations were even higher than during the control run, most likely due to the different hydraulic conditions when the effluent well was used as pumping well. The reason for the poor performance of ICS in the field test can mostly be attributed to the attachment of viruses and bacteria to organic matter in the septic effluent. Viruses and bacteria attached to organic matter would not sorb onto hydrophilic ICS, but can be removed by the hydrophobic surfactant coating of the zeolite. Also, other particles or chemical species present in the wetland may have preferably interacted with the iron coating.

Based on the sorption and inactivation results, most of the virus removal by SMZ can be attributed to sorption. This observation is also consistent with model aquifer tests conducted without permeable barriers, where both irreversible and reversible sorption occurred at significant levels (Schulze-Makuch et al., 2002). The presence of reversible sorption in the field tests can be inferred from the delayed breakthroughs for both ICS and SMZ compared to the bromide migration rate. The retardation factors of MS2 in ICS and SMZ in the field tests were 1.3 and 1.7, respectively. Aside from irreversible and reversible sorption, virus inactivation by surfactant in aqueous solution appears also to be a significant process. It was observed that a minor amount of the surfactant coating detached and dissolved into the water and thus probably removed a significant percentage of the viruses in the field test. Natural inactivation, on the other hand, appears to be negligible on the time scales considered here. However, eventually the attached viruses are deactivated, probably on a time scale of tens of days (Keswick et al., 1982).

The most intriguing result is the complete removal of E. coli by SMZ during the field tests. The surfactant used to prepare SMZ, hexadecyltrimethylammonium (HDTMA), is bactericidal in aqueous solution even at low concentrations. However, if sorbed, E. coli may still stay alive for an unknown period of time, because the toxicity of HDTMA to the organisms is greatly reduced or eliminated if the surfactant is bound to zeolite (Fuierer et al., 2001).

Example 2

The objective here was to evaluate two different types of reactive media under realistic field conditions in regard to their removal capabilities for viruses and bacteria, namely iron oxide coated sand (ICS) and surfactant modified zeolite (SMZ), both for short term and long term applications. The underlying hypothesis was that a feasible barrier would have practical applications for protection of drinking water wells, or in the construction of filter beds to treat water from septic tanks and animal waste lagoons.

Materials and Methods

The bacterium *E. coli* and the virus MS2 were used as tracer organisms to simulate the behavior of enteric pathogens in groundwater. These organisms have been used extensively by other investigators to study the fate and persistence of enteric pathogens in groundwater. Male specific coliphages such as MS2 serve as surrogates for investigating enteric virus behavior in the environment because of their reported similarities in dimensions and behavior to enteric viruses, relatively low assay costs, and reduced infection hazard (Sobsey et al., 1995; Yates and Jury, 1996; Nasser and Oman, 1999; Dowd et al., 1998).

The *E. coli* strain used in this study was *E. coli* ATCC 13706 and was grown in Tryptic Soy Broth (TSB). For the field studies, the bacterial cells were prepared as overnight cultures in TSB at 37° C. The cells were pelleted by centrifugation, washed twice in 0.1% peptone, and finally resuspended as a high titer preparation in 100 ml of 0.1% peptone. The titer was determined prior to field injection. High titer preparations of the bacteriophage MS2 were prepared using *E. coli* Famp (USEPA, 2000) as the host bacterial strain and the double agar layer method (Adams, 1959). *E. coli* Famp is a host strain that USEPA (United States Environmental Protection Agency) recommends for the detection of male specific coliphages. The high titer preparations were filter sterilized (0.2 μm) prior to injection. The groundwater samples from the field study were analyzed for *E. coli* using the 3M *E. coli* PetriFilm™ (Minneapolis, Minn.). 0.1 ml of the undiluted sample was placed on the PetriFilm and the film incubated overnight at 37° C. Blue to reddish blue colonies with gas bubbles that were characteristic of *E. coli* were enumerated for calculating the *E. coli* titer in the samples. In some instances the sample was diluted and aliquots of the dilutions were plated on the PetriFilm™. The ground-water samples were analyzed for the bacteriophage MS2 using the double agar overlay method. The ground-water samples were initially diluted in 0.1% peptone solution. One milliliter aliquots of these dilutions were added to 1 mL of the host bacterium (*E. coli* Famp) and 3 ml of overlay agar. This mixture was added to pre-poured TSA plates and the plates were incubated at 37° C. for 24 hours. The resulting plaques that formed on these plates were enumerated and used for calculating the titer (PFU/mL) in the samples. Positive and negative controls were routinely run with all samples. Bromide concentrations in the groundwater samples were measured using a bromide electrode with a detection limit of 0.8 mg/L.

Barrier Materials

The field experiments were conducted using iron-oxide coated sand (ICS) and surfactant-modified zeolite (SMZ) as barrier materials. Pure sand was used as a control. Sand and gravel grains coated with ferric oxyhydroxides were prepared by adding anhydrous $FeCl_3$ solution and precipitating iron oxyhydroxides at high pH with the addition of NaOH (Loveland et al., 1996). The sand and gravel were then dried at 95° C. overnight after several days of coating. The sand was rinsed through a 1000-μm sieve to remove fine particulates of iron oxide, and the gravel was rinsed 10 times using tap water to remove particulates of iron oxide. The grain size distribution was 80% gravel by weight with a diameter ranging from 4 to 24 mm and 20% sand with a diameter ranging from 0.25 to 1 mm. The iron coating increased the surface $pH^{iep}$ of the sand, which consisted of a mix of quartz and feldspars, from less than 7 to about 8.5. The SMZ used in the field experiments possessed the same characteristics as that of the SMZ used and described in Example 1.

Field Experiment Design

The field experiments were conducted at a submerged-flow constructed wetland at a Texas A&M University System facility in El Paso. The field site consisted of a house, septic system, and a constructed submerged wetland. Sewage effluent was pumped from the septic system into the submerged wetland. The wetland is 7.62 m by 3.05 m in area and filled with pea gravel with a grain size of 0.95 cm. The gravel depth ranges from 30.5 cm to 39.6 cm from the influent to the effluent end with a 1% slope along the long axis of the wetland (FIG. 3). Before the field tests were initiated, water samples from the constructed wetland were analyzed for *E. coli* and male-specific coliphages. For each of the following tests, a total concentration of about $2.5 \times 10^{11}$ plaque-forming units (pfu) of MS-2 and about $2 \times 10^7$ cell-forming units (cfu) of *E. coli* were prepared in separate 3.785 L containers of deionized water containing 300 mg/L of NaCl to prevent osmotic shock. Forty grams of NaBr to serve as a water tracer was diluted in another 3.785 L container of deionized water. The MS-2, *E. coli* and NaBr solutions were then injected together into a well at the up gradient end of the constructed wetland. A well at the down gradient end of the wetland was used to monitor effluent concentrations (FIG. 3). The well had a diameter of 10 cm and was screened from 25 to 40 cm below the ground surface. Effluent concentrations were also measured at the outflow of the constructed wetland. The distance between the injection well and the down gradient well was 6.5 m.

The first field test, a control run, was conducted without any reactive medium. The down gradient well was used solely as monitoring well (no pumping). In the tests using ICS and SMZ as barrier materials, the reactive media were used as filter packs with a thickness of about 10 cm around the well screen of the down gradient well. The ICS and SMZ filter packs were installed from ground surface to the bottom of the screen at 40 cm. For the tests with barriers the down gradient well was pumped at a rate of 12 ml/s to mimic a domestic water supply well. With this rate of pumping, approximately ⅔ of the discharged water from the wetland was extracted by the well and ⅓ of the water was discharged through the outflow. The average residence time of the water in the filter pack was calculated to be about 2 minutes. This experimental design allowed evaluation of the efficiencies of ICS and SMZ in removing viral and bacterial concentrations from the septic ground water by comparing (1) ICS and SMZ results to the control run without any reactive medium, and (2) comparing the water analysis results from the pumping well to those of the outflow of the wetland, where no interaction with reactive material occurred. The control run and tests with ICS and SMZ as filter packs were run within a week of one another. A subsequent test was conducted after the SMZ filter pack had been in place for more than five months, in order to evaluate the long-term pathogen removal efficiency of the SMZ. The second SMZ barrier test was conducted under the same conditions as the first test. Along with pathogen and bromide concentrations, dissolved oxygen, electrical conductivity, redox-potential, pH, temperature and flow rate were monitored during the field experiments. Table 1 displays the aforementioned field parameters measured during experimentation.

TABLE 1

| Field Test | Dissolved oxygen (mean, mg/L) | Electrical conductivity (range, mS/cm) | Redox Potential (mean, mV) | pH (mean) | Temperature Mean, °C. | Discharge rate at well (ml/s) |
|---|---|---|---|---|---|---|
| Control Run-14 Aug. 2001 | 0.4 | 1.04-1.96 | NA | 7.15 | 26.3 | 0 |
| ICS Run-18 Aug. 2001 | 3.5 | 0.98-1.05 | −13.0 | 7.34 | 26.0 | 12 |
| SMZ-20 Aug. 2001 Run | 2.7 | 0.97-2.85 | −18.0 | 7.31 | 25.9 | 12 |
| SMZ-24 Jan. 2002 Run | 3.3 | 0.72-0.80 | −19.8 | 7.03 | 14.5 | 12 |

In Table 1, values are given as geometric means except for electrical conductivity, which is given as a range. The high electrical conductivity of the SMZ—20 Aug. 2001 run may be due to some initial surfactant release response of the SMZ.

Results

Figure 5:
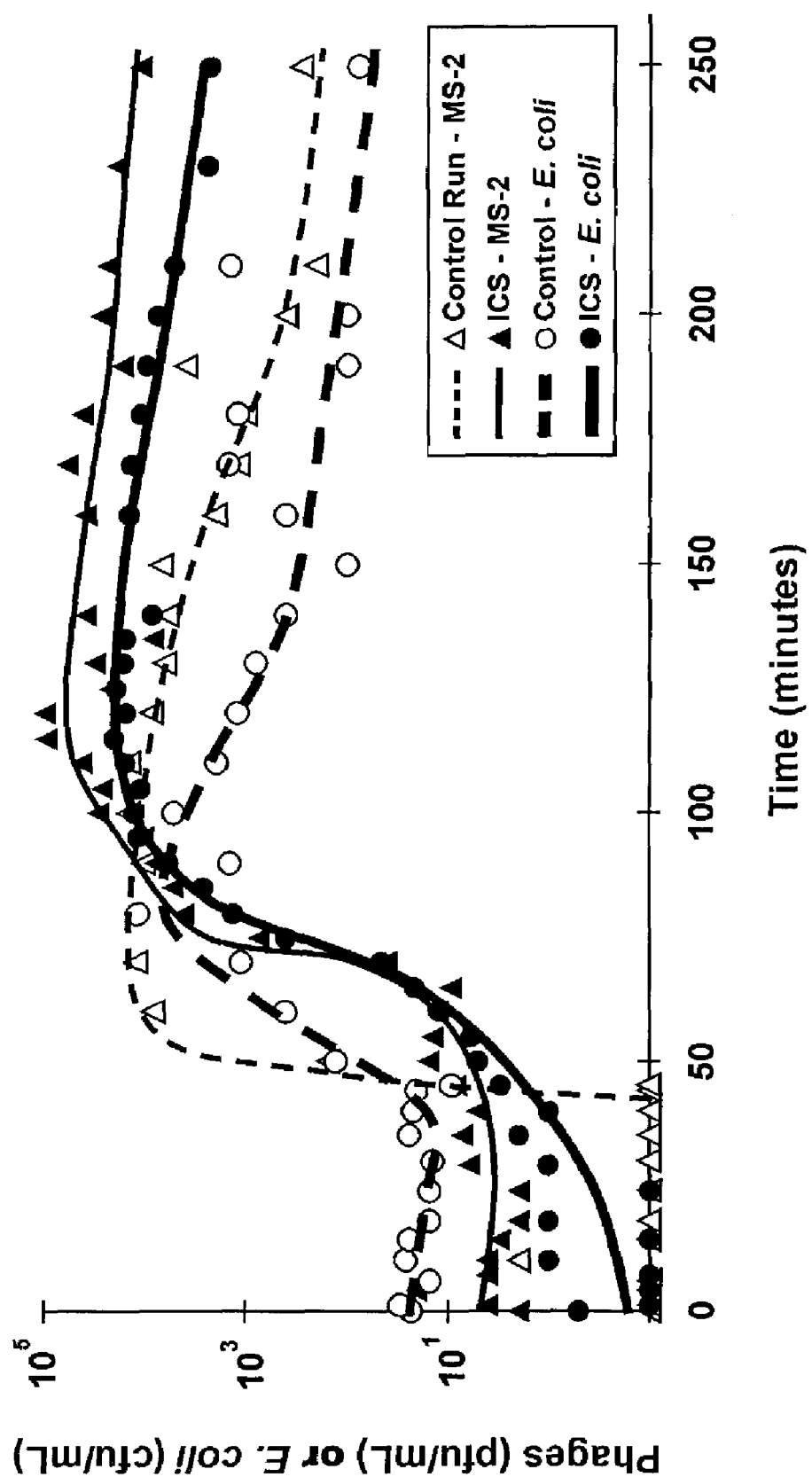
FIG. 5 shows MS-2 and *E. coli* concentrations at the down gradient well measured during an iron-oxide-coated sand run and a control run. During the iron-oxide-coated sand run, the well was pumped at a rate of 12 ml/s, while it was only used as a monitoring well during the control run.
Figure 6:
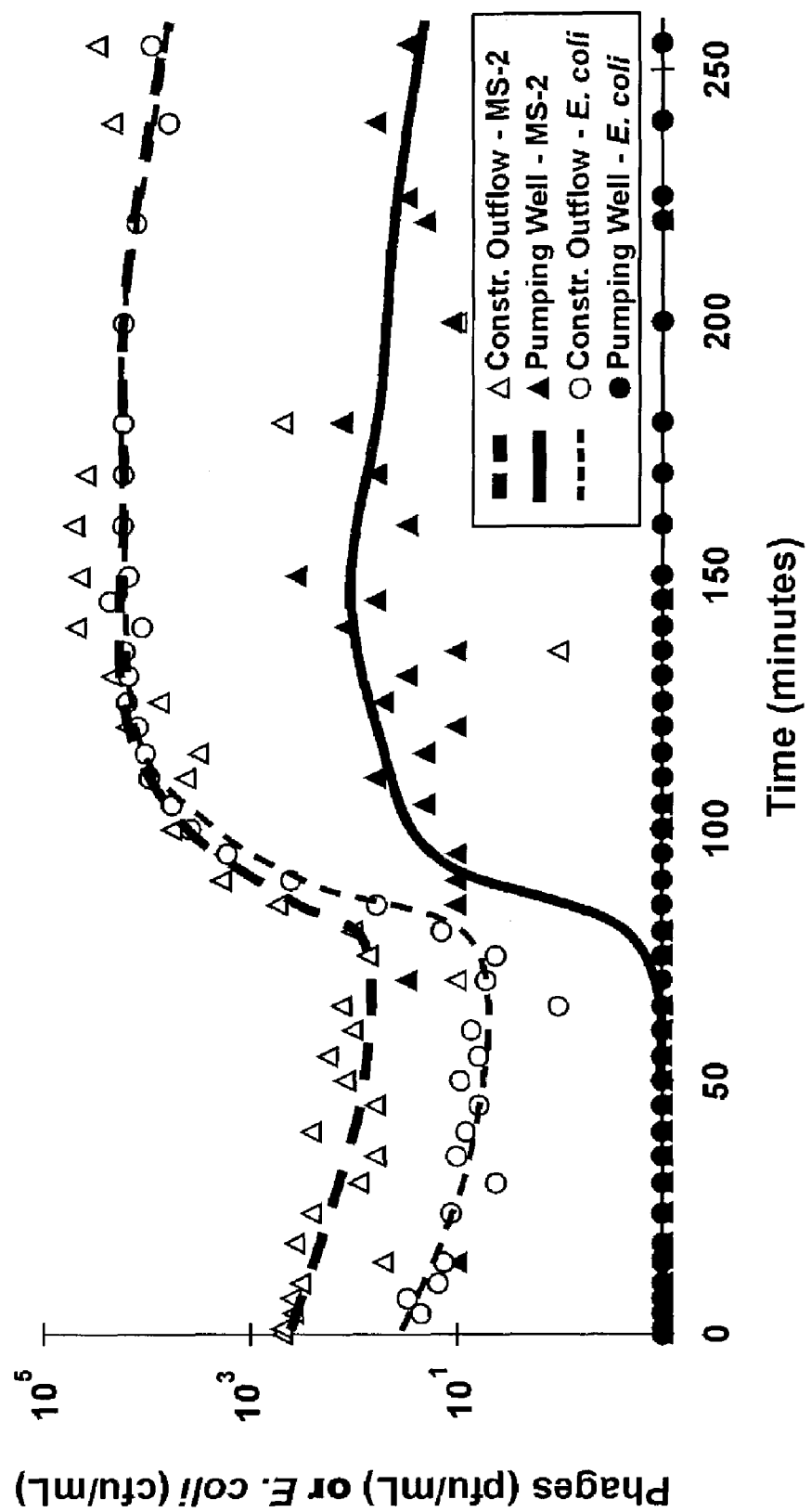
FIG. 6 shows MS-2 and *E. coli* concentrations at the constructed outflow and pumping well during the first SMZ run.

Iron-oxide coated sand (ICS) proved not to be efficient for the removal of either E. coli or MS2 from the septic ground water. In fact, E. coli and MS2 concentrations were higher in the effluent of the pumping well than in the control run (FIG. 5); probably due to incomplete mixing in the wetland during the ICS experiment that allowed the removal of most of the injected material by the pumping well. The experiments using SMZ as a barrier were conducted under the same conditions as the ICS field experiment. Thus, the measured E. coli and MS2 concentrations during the ICS field experiments were used as a baseline for evaluating the efficiency of the SMZ barrier. The first SMZ field experiment was conducted on Aug. 20, 2001, and showed that the SMZ barrier removed at least 99% of the MS2 and 100% of E. coli compared to the measured concentrations at the wetland outflow (FIG. 6). In fact, not a single E. coli was detected in effluent from the pumping well using SMZ as filter pack material. A removal efficiency of at least 99% for MS2 is also supported when comparing the effluent concentrations from the pumping well of the SMZ run with the ICS run (FIG. 7).

Figure 7:
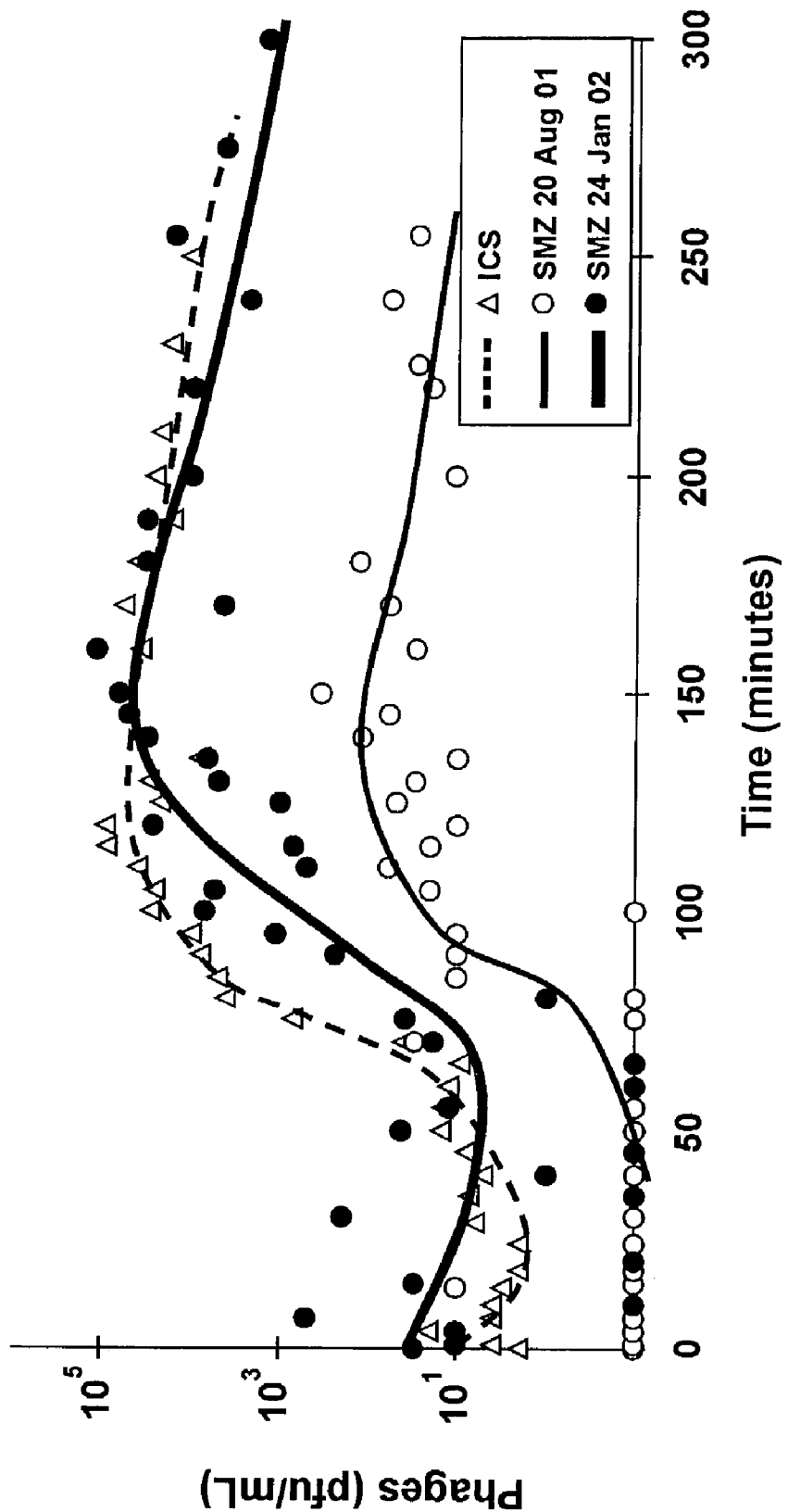
FIG. 7 shows MS-2 concentrations as measured at the pumping well during the iron-oxide-coated sane run and the two SMZ runs.
Figure 8:
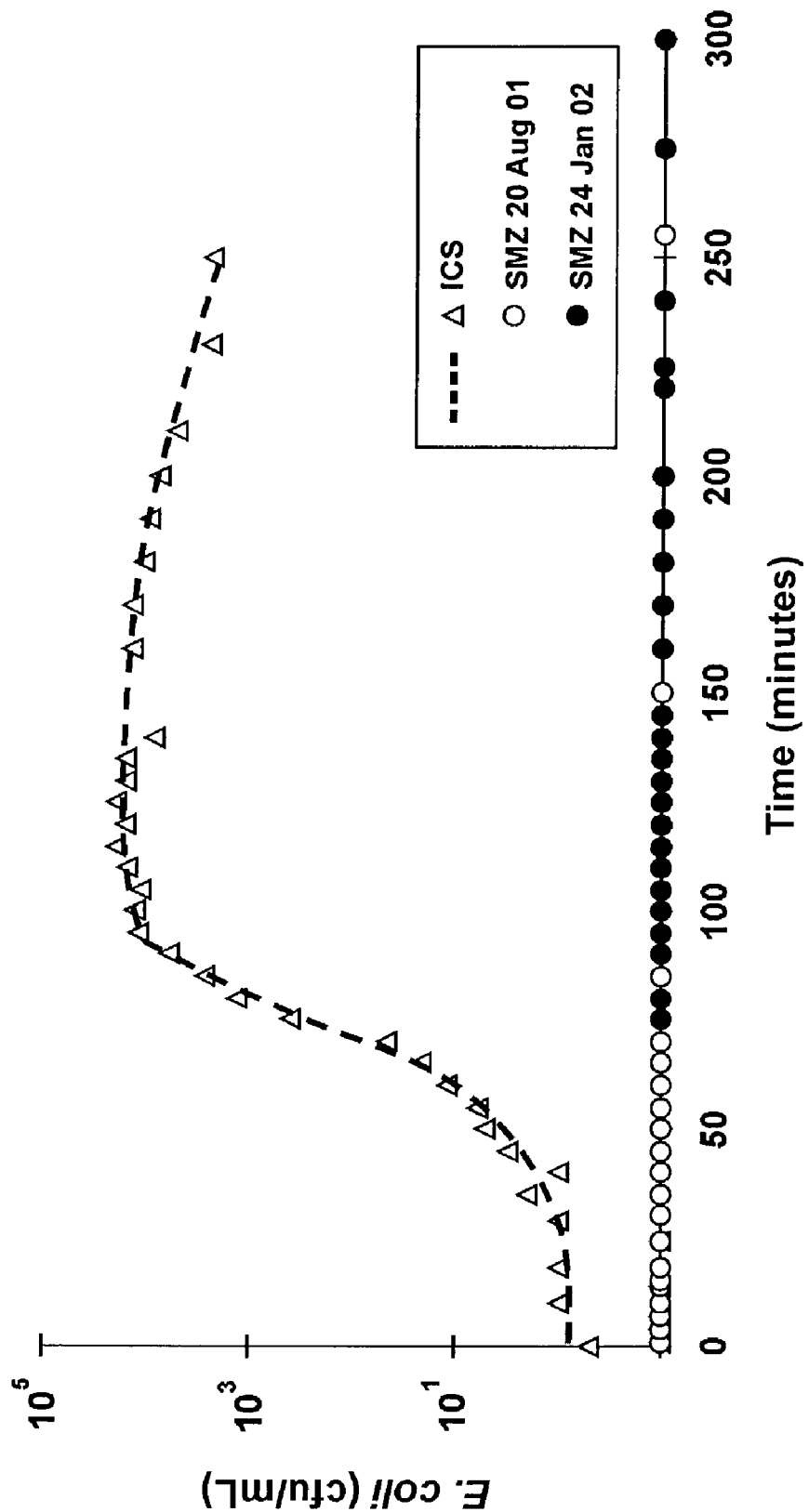
FIG. 8 shows *E. coli* concentrations as measured at the pumping well during the iron-oxide-coated sand run and the two SMZ runs.

When repeating the MS2/E. coli experiment more than 5 months later, SMZ showed little efficiency for MS2 removal (FIG. 7). After 5 months, the SMZ barrier did, however, still remove 100% of E. coli from the ground water (FIG. 8). Even after 5 months, the SMZ filter pack still showed retardation of the Br tracer (data not shown), indicating that at least part of the surfactant bilayer was still intact.

Discussion

Surfactant-modified zeolite worked extremely well as a barrier to E. coli transport both while fresh and after nearly ½ year in use. No single E. coli bacterium could be cultured from the pumping well effluent. This long-term efficiency of SMZ observed for E. coli removal was not observed for bacteriophage MS2, however. While the SMZ removed more than 99% of the viruses when fresh, no significant removal of viruses could be substantiated 5 months later. Clearly, the surface properties of the SMZ changed during the intervening time period.

Earlier experiments have shown that the HDTMA bilayer formed on the zeolite surface slowly washes off over time (Li et al., 1998; Li et al., 2002). Other research showed that SMZ is not toxic to organisms found in sewage, and that contaminant-degrading organisms can be cultured in the presence of SMZ (Li et al., 1998; Fuierer et al., 2001). Recent experiments conducted by Pillai (2002) indicated no effect of pure zeolite on E. coli growth and no such effects were found to be reported in the literature. Thus, one possible cause for the decrease in MS2 removal during the 5-month interval was a change in SMZ surface properties due to partial HDTMA wash off, in contrast to some toxicity effect of the HDTMA. As the HDTMA content on the surface decreases, the SMZ begins to lose its anion exchange characteristics (Li and Bowman, 1998b). This decrease in anion exchange activity would have the strongest effect on MS2 retention, given MS2's small size and hydrophilic nature. In contrast, the much larger, polyanionic E. coli could still be retained by the residual positive charge on the SMZ, perhaps along with hydrophobic interactions with the bound HDTMA. Bacteria such as E. coli exhibit significant hydrophobic properties, as well as having a cell membrane structure composed of surfactant-like lipids (Gammack et al., 1992). It appears that the combination of electrostatic and hydrophobic interactions of E. coli with SMZ remained sufficiently strong after 5 months to still allow effective E. coli removal by the SMZ filter pack.

Another possible explanation for the decrease in SMZ's affinity for MS2 is the blockage of sites by irreversible sorption of large organic solutes or colloids present in the sewage effluent. Again, this effect would be more pronounced for MS2 than for E. coli due to their differences in size and surface characteristics. Although the SMZ's affinity for MS2 decreased sharply, the SMZ still retarded bromide arrival in the pumping well relative to the constructed outflow. Table 2 displays the peak concentrations and peak times of bromide breakthrough in the field experiments

TABLE 2

| Field Test | Pumping Well Peak Concentration (mg/L) | Pumping Well Peak Time (min) | Constructed Outflow Peak Concentration (mg/L) | Constructed Outflow Peak Time (min) |
|---|---|---|---|---|
| ICS Run - 18 Aug. 2001 | 63.1 | 140 | 30.8 | 135 |
| SMZ - 20 Aug. 2001 Run | 24.2 | 180 | 28.4 | 175 |
| SMZ - 24 Jan. 2002 Run | 34.7 | 190 | 43.5 | 170 |

In the initial SMZ experiment HDTMA may have washed off at a high enough rate to deactivate MS2. Inactivation by dissolved surfactant can play a significant role as shown by laboratory experiments, although most of the inactivation could be attributed to direct sorption by SMZ (Schulze-Makuch et al., 2002a). Although the wash-off rate may have been high initially, the desorption rate must have decreased leaving enough HDTMA on the surface to adsorb bromide and *E. coli*.

Another possible explanation for the decreased MS2 retention in the second SMZ run is irreversible sorption of other effluent solutes and particulates over time. Irreversible sorption would have the effect of blocking some fraction of pathogen sorption sites on the SMZ. Again, this effect would be expected to be greater for sorption of MS2 than for the much larger, multivalent *E. coli*.

It is generally believed that viruses are inactivated in the ground-water environment in a matter of days, especially under the conditions encountered at this field site. One of the estimates on the higher end was provided by Keswick et al (1982) who argued that deactivation would occur on a time scale of 10s of days. In the second SMZ experiment, however, a significant number of MS2 bacteriophages in background samples and at early time periods (FIG. 7; t=0 min: 30 pfu/ml, t=1 min: 10 pfu/ml, t=4 min: 10 pfu/ml) was noted that could only have derived from the previous barrier experiments conducted 5 months earlier. This indicates that viruses may be capable of surviving for much longer time periods in the natural subsurface than previously thought.

Based on the data, no long-term release of *E. coli* from the SMZ occurred. Measured *E. coli* concentrations at early time periods (including t=0) from the ICS experiment showed residual *E. coli* concentrations from the preceding control run (FIG. 8). Background concentrations of *E. coli* were also observed at the constructed outflow from both SMZ runs (FIG. 6; 6 cfu/ml at t=1 min for the second SMZ run). However, no background concentrations of *E. coli* were observed in the pumping well either in the SMZ experiment of 20 Aug. 2001 or in the second SMZ barrier experiment conducted more than 5 months later, indicating that once *E. coli* was adsorbed to the SMZ no release of active pathogens occurred. If subsequent tests show that *E. coli* is permanently removed from drinking water by SMZ, this would greatly enhance the usefulness of SMZ for drinking water protection.

Under natural conditions, pathogen concentrations typically will be much lower than those used in the field experiments. Maschinski et al. (1999) studied the reduction of coliforms in a subsurface constructed wetland system and detected total coliform concentrations averaging about 104 cfu/ml and fecal coliforms averaging about 103 cfu/ml in the outlet of a septic system. Pillai and Vega (1999) conducted a 25 week monitoring study of the septic site used in this study and detected fecal coliforms averaging about 103 mpn/ml and male specific coliphages averaging about 101 pfu/ml. Thus, the effectiveness and lifetime of an SMZ filter pack are expected to be at least as great as observed here.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references are herein incorporated by reference in their entirety.

U.S. Pat. No. 6,261,986
U.S. Pat. No. 6,110,479
U.S. Pat. No. 6,034,010
U.S. Pat. No. 5,872,068
Adams, M. H. 1959. Bacteriophage. Interscience, New York.
Bales, R. C.; Hinkle, S. R.; Kroeger T. W.; Stocking K.; and C. P. Gerba. 1991. Bacteriophage adsorption during transport through porous media: chemical perturbations and reversibility, *Environ. Sci. Techn.* 25, 2088-2095.
Bowman R. S., Z. Li, S. J. Roy, T. Burt, T. L. Johnson, and R. L. Johnson. 2001. Pilot test of a surfactant modified zeolite permeable barrier for ground water remediation. p. 161-185. In J. A. Smith and S. Bums, (eds.). Physical and Chemical Remediation of Contaminated Aquifers. Kluwer Academic Publishers.
Bowman, R. S., E. J. Sullivan, and Z. Li. 2000. Uptake of cations, anions, and nonpolar organic molecules by surfactant-modified clinoptilolite-rich tuff. p. 287-297. In C. Colella and F. A Mumpton (eds.) Natural zeolites for the third millenium. De Frede Editore, Naples, Italy.
Cadena, F.; and R. S. Bowman. 1994. Treatment of waters contaminated with BTX and heavy metals using tailored zeolites, *Proc. of the 4th Annual WERC Technology Development Conference*, 297-310.
CDC (U.S. Center of Disease Control and Prevention). 1993. Surveillance of waterborne disease outbreaks, United States, 1991-1992. *CDC Surveill. Summ.* 32, 1-22, Centers for Disease Control, Atlanta.
Cothern, C. R. 1992. Comparative environmental risk assessment. Lewis Publishers, Boca Raton, Fla.
Craun, G. F. 1986. Statistics of waterborne outbreaks in the U.S. (1920-1980). *In: Water Diseases in the United States* (G. F. Craun, ed.). Boca Raton, Fla.: CRC Press, 73-159.
Craun, G. F. and R. Calderon. 1996. Microbial risks in groundwater systems. Epidemiology of waterborne outbreaks. In: Under the microscope. Groundwater Foundation Symposium Proceedings, Sept. 5-6, Boston, AWWA, p. 9-20.
Czako, T. 1994. Groundwater monitoring network in Denmark: example of results in the Nyborg area. Hydrol. Sci. 39 (1), 1-17.
Dentel, S. K.; Jamrah, A. I.; and D. L. Sparks. 1998. Sorption and cosorption of 1,2,4-trichlorobenzene and tannic acid by organoclays. *Water Research* 32, no. 12, 3689-3697.
Dowd, S. E. 1996. Survival, adsorption, and subsurface transport of indicator viruses in aquifers using laboratory and field experiments, unpublished *Master Thesis, Texas A&M University*.
Dowd, S. E., and S. D. Pillai. 1997. Survival and transport of selected bacterial pathogens and indicator viruses under sandy aquifer conditions. J. Environ. Sci. Health. Part A. 32, 2245-2258.
Dowd, S. E., Pillai, S. D., Wang, S. and Y. M. Corapcioglu. 1998. Delineating the specific influence of viral isoelectric point and size on viral adsorption and transport through sandy soils. Appl. Environ. Microbiol. 64, 405-410.

Fuierer, A. M, Bowman, R. S., and T. L. Kieft. 2001. Sorption and microbial degradation of toluene on a surfactant-modified-zeolite support. Proc. Sixth International Symp. on In Situ and On-Site Bioremediation, 4-7 Jun. 2001, San Diego, Calif.

Gagliardi, J. V. and J. S. Karns. 2000. Leaching of *Escherichia coli* 0157;H7 in diverse soils under various agricultural management practices. Appl. Environ. Microbiol. 66, 877-883

Gammack, S. M., Paterson, E., Kemp, J. S., Cresser, M. S. and K. Killham. 1992. Factors affecting the movement of microorganisms in soils. In: Soil biochemistry. G. Stotzky and J.-M. Bollag (eds)., vol. 7. Marcel Dekker, New York, p. 263-305.

Gerba, C. P., Goyal, S. M., Cech, I. and S. R. Yates. 1981. Quantitative assessment of the adsorptive behavior of viruses to soil. Environ. Sci. Technol. 15, 940-944.

Gerba, C. P.; Yates, M. V. and S. R. Yates. 1991. Quantification of factors controlling viral and bacterial transport in the subsurface. In *Modeling the Environmental Fate of Microorganisms* (edited by Hurst, C. J.) 77-88, Am. Soc. for Microbiology, Washington, D.C., 1991.

Hagedorn, C.; and R. B. Reneau, Jr. 2001. Land-based systems for waste treatment. www.bsi.vt.edu/reneau/cses4644/cses_4644/section13b.pdf.

Harvey, R. 1991. Parameters involved in modeling movement of bacteria in ground water. In *Modeling the Environmental Fate of Microorganisms* (edited by Hurst, C. J.) Am. Soc. for Microbiology, Washington, D.C.

Hust, C. J., Gerba, C. P. and I. Cech. 1980. Effects of environmental variables and soil characteristics on virus survival in soil. Appl. Environ. Microbiol. 40, 1067-1079.

Idelovitch, E.; Terkeltoub, R.; and M. Medi. 1980. The role of ground water recharge in wastewater reuse; Israel's Dan region project. *American Water Works Association* 72, no. 7, 391-400.

Jin, Y.; Chu, Y.; and Y. Li. 2000. Virus removal and transport in saturated and unsaturated sand columns. *Journal of Contaminant Hydrology* 43, 111-128.

Keswick, B. H.; Gerba, C. P.; Secor, S. L.; and I. Cech. 1982. Survival of enteric viruses and indicator bacteria in ground water, *Environ. Sci. Technol.* 17, 903-912.

Li, Z., and R. S. Bowman. 1998a. Sorption of chromate and PCE by surfactant-modified clay minerals. *Environ. Eng. Sci.* 3: 237-245.

Li, Z., and R. S. Bowman. 1998b. Sorption of perchloroethylene by surfactant-modified zeolite as controlled by surfactant loading. *Environ. Sci. Technol.* 32: 2278-2282.

Li, Z., and R. S. Bowman. 2001. Retention of inorganic oxyanions by organo-kaolinite. *Water Res.* 35: 3771-3776.

Li, Z.; Roy, S. J.; Zou, Y.; and R. S. Bowman. 1998. Long-term chemical and biological stability of surfactant-modified zeolite. *Environ. Sci. Techn.* 32, 2628-2632.

Li, Z.; Todd, B.; and R. S. Bowman. 2000. Sorption of ionizable organic solutes by surfactant-modified zeolite, *Environ. Sci. Techn.* 34, 3756-3760.

Li, Z., C. Willms, S. Roy, and R. S. Bowman. 2003. Desorption of hexadecyltrimethylammonium from charged mineral surfaces. *Environ. Geosci.* (submitted).

Loveland J. P.; Ryan J. N.; Amy G. L.; and R. W. Harvey. 1996. The reversibility of virus attachment to mineral surfaces. *Colloids and Surfaces A: Physicochemical and Engineering Aspects* 107, 205-221.

Maschinski, J., Southam, G., Hines, J. and S. Stromeyer. 1999. Efficiency of a subsurface constructed wetland system using native southwestern U.S. plants. J. Env. Qual., 28, 225-231.

Nasser, A. M.; and S. D. Oman. 1999. Quantitative assessment of the inactivation of pathogenic and indicator viruses in natural water source. Water Res. 33 (7), 1748-1752.

Pillai, S. D. 1998. Microbial pathogens Microbial pathogens in aquifers: principals and protocols. Springer Verlag, Berlin, 125 p.

Pillai, S. D. and E. Vega. 1999. Pathogen removal with on-site wastewater treatment technologies. Proceedings of the "Alliance for environmental stewardship: a comprehensive approach". St. Louis, Mo.

Platt, A. 1996. The World Watch Report: Water-borne Killers. The World Watch Institute, distributed by Los Angeles Times syndicate.

Rehmann, L. L.; Welty, C., and R. W. Harvey. 1999. Stochastic analysis of virus transport in aquifers, *Water Resources Research* 35, 1987-2006.

Rose, J B., and M. V. Yates. 1998. Microbial Risk Assessment Applications for Ground water. In Pillai S. D. (edit): *Microbial Pathogens Within Aquifers,* 113-131, 1998.

Rose, J. B., Haas, C. N. and C. P. Gerba. 1997. Risk assessment for microbial contaminants in water. American Water Works Association, Denver, Colo.

Schaub, S. A. and C. A. Sorber. 1979. Virus and bacteria removal from wastewater by rapid infiltration through soil. *Appl. Environ. Microbiol.* 33, 609-619.

Schijven, J. F., Hassanizadeh, S. M., Dowd, S. E. and S. D. Pillai. 2001. Modeling virus adsorption in batch and column experiments. Quant. Microbiol 2, 5-20

Schulze-Makuch, D., Pillai, S. D., Huan, H., Bowman, R. S., Couroux, E., Hielscher, F., Totten, J., Espinosa, I. Y., and T. G. Kretzschmar. 2002a. Surfactant-modified zeolite can protect drinking water wells from viruses and bacteria. EOS, Transactions American Geophysical Union 83, no. 18, p. 193&200-201.

Schulze-Makuch, D., Guan, H. and S. D. Pillai. 2002b. Effects of pH and geological medium on bacteriophage MS-2 transport in a model aquifer. *Geomicrobiology Journal*, in press.

Solley, W. B., Mewrck, C. F. and R. R. Pierce. 1988. Estimated use of water in the United States in 1985. U.S. Geological Survey Circular #1004.

Solo-Garbriele, H. M., Wolfert, M. A., Desmarais, T. R. and C. J. Palmer. 2000. Sources of *Escherichia coli* in a coastal subtropical environment. Appl. Environ. Microbiol. 66, 230-237

Sobsey, M. D.; Hall, R. M.; and R. L. Hazard. 1995. Comparative reductions of Hepatitis A virus, enteroviruses and coliphage MS-2 in miniature soil columns. *Water Science and Technology* 31(5-6), 203-209.

USEPA (United Sates Environmental Protection Agency). 2000. Method 1601—Male-specific (F+) and somatic coliphages in water by two-step enrichment procedure. Office of Water, Washington, D.C., PA 821-R-00-009.

Woessner, W. W., Ball, P. N., DeBorde, D. C., and T. L. Troy. 2001. Viral transport in a sand and gravel aquifer under filed pumping conditions. Ground Water, 39 (6), 886-894.

www.lifewater.ca

Yates, M. V., Gerba, C. P. and L. M. Kelley. 1985. Virus persistence in groundwater. Appl. Environ. Microbiol. 49, 778-781.

Yates, M. V. and W. A. Jury. 1996. On the use of virus transport modeling for determining regulatory compliance. *Journal of Environmental Quality* 24, 1051-1055.

What is claimed is:

1. A method of removing biological pathogens from a fluid by passing the fluid through a filter utilizing a surfactant-modified zeolite (SMZ).

2. The method of claim 1, wherein biological pathogens include bacteria, viruses, protozoa, parasites, spores, molds, and microbes.

3. The method of claim 1, wherein the fluid is water.

4. The method of claim 3, wherein water is drinking water, well water, ground water, surface water, or waste water.

5. The method of claim 1, wherein the SMZ is in granular form.

6. The method of claim 5, wherein the SMZ is combined with a binder material.

7. The method of claim 6, wherein the SMZ is formed into a solid structure.

8. The method of claim 7, wherein the solid structure is in a form suitable for inclusion into a filtration device.

9. A method of removing biological pathogens from a fluid-based gel by passing the fluid-based gel through a filter utilizing a surfactant-modified zeolite (SMZ).

10. The method of claim 9, wherein biological pathogens include bacteria, viruses, protozoa, spores, molds, parasites, and microbes.

11. The method of claim 9, wherein the fluid-based gel is water-based.

12. The method of claim 9, wherein the SMZ is in granular form.

13. The method of claim 12, wherein the SMZ is combined with a binder material.

14. The method of claim 13, wherein the SMZ is formed into a solid structure.

15. The method of claim 14, wherein the solid structure is in a form suitable for inclusion into a filtration device.

16. The method of claim 15, wherein the filtration device is a potable water filter.

17. The method of claim 15, wherein the filtration device is a point of use water filter.

18. The method of claim 15, wherein the filtration device is a filter packet suitable for placement in a body of water.

19. The method of claim 18, wherein the filtration device is placed directly in the body of water as a permeable barrier or a filter pack.

20. The method of claim 19, wherein the filtration device is placed in or around a water well.

* * * * *

UNITED STATES PATENT AND TRADEMARK OFFICE
CERTIFICATE OF CORRECTION

| | | |
|---|---|---|
| PATENT NO. | : 7,311,839 B2 | Page 1 of 1 |
| APPLICATION NO. | : 10/429222 | |
| DATED | : December 25, 2007 | |
| INVENTOR(S) | : Dirk Schulze-Makuch et al. | |

It is certified that error appears in the above-identified patent and that said Letters Patent is hereby corrected as shown below:

In column 1, line 12, please delete "may own" and insert --has certain-- therefor.

In column 20, line 27, please insert the following claims:
--21. The method of claim 1, wherein the SMZ is a gel.
22. The method of claim 1, wherein the SMZ is contained in a colloidal suspension.
23. The method of claim 9, wherein the SMZ is a gel.
24. The method of claim 9, wherein the SMZ is contained in a colloidal suspension.--

Signed and Sealed this

Twenty Second Day of April, 2008

JON W. DUDAS
*Director of the United States Patent and Trademark Office*